United States Patent
O'Connor et al.

(10) Patent No.: US 7,240,168 B2
(45) Date of Patent: Jul. 3, 2007

(54) METHOD AND SYSTEM TO ORDER MEMORY OPERATIONS

(75) Inventors: Dennis M. O'Connor, Chandler, AZ (US); Michael W. Morrow, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 508 days.

(21) Appl. No.: 10/799,564

(22) Filed: Mar. 10, 2004

(65) Prior Publication Data

US 2005/0204112 A1   Sep. 15, 2005

(51) Int. Cl.
*G06F 13/00* (2006.01)
(52) U.S. Cl. ....................... 711/150; 711/151
(58) Field of Classification Search ............... None
See application file for complete search history.

(56) References Cited

U.S. PATENT DOCUMENTS

| | | |
|---|---|---|
| 4,663,706 A | 5/1987 | Allen et al. |
| 6,055,605 A * | 4/2000 | Sharma et al. ............ 711/130 |

FOREIGN PATENT DOCUMENTS

| | | |
|---|---|---|
| EP | 0 637 799 A | 2/1995 |
| WO | WO 97/04392 A | 2/1997 |

OTHER PUBLICATIONS

Gharachorloo et al. Memory Consistency and Event Ordering in Scalable Shared-Memory Multiprocessors, 1990 IEEE, pp. 15-26).*
John L. Hennessy, et al., "Computer Architecture", A Quantitative Approach, 3rd Addition 2003, pp. 531, 549, 550-551, 605-608.
K. Gharachorloo, et al., Memory Consistency and Event Ordering In Scalable Shared-Menory Multiprocessors, 1990 IEEE, pp. 15-26.
PCT ISR & WO dated Oct. 5, 2005.

* cited by examiner

*Primary Examiner*—T Nguyen
(74) *Attorney, Agent, or Firm*—John F. Travis

(57) ABSTRACT

Briefly, in accordance with an embodiment of the invention, a system and method to order memory operations is provided. The method may include using at least one signal to indicate that a particular kind of memory operation is not globally observable but is observable by at least one processor of the system. The system may include a processor to use at least one signal for memory consistency, wherein the at least one signal indicates that a particular kind of memory operation is not globally observable in the system but is observable by at least one processor of the system. Other embodiments are described and claimed.

33 Claims, 1 Drawing Sheet

METHOD AND SYSTEM TO ORDER MEMORY OPERATIONS

BACKGROUND

Various memory ordering schemes may be implemented in a computing system to address when a processor in a multiprocessor system "sees" memory operations by other processors. Memory ordering may also be referred to as memory consistency or event ordering. Memory operations, such as a load operation or store operation, may be seen at different times by different processors. This may lead to software not executing as expected or operating differently on a multiprocessor system compared to a uniprocessor system.

To address memory consistency, some memory consistency models have been developed. The different models have tradeoffs in terms of system performance.

Thus, there is a continuing need for alternate ways to implement memory consistency in a system.

BRIEF DESCRIPTION OF THE DRAWINGS

The subject matter regarded as the invention is particularly pointed out and distinctly claimed in the concluding portion of the specification. The present invention, however, both as to organization and method of operation, together with objects, features, and advantages thereof, may best be understood by reference to the following detailed description when read with the accompanying drawings in which:

Figure 1:
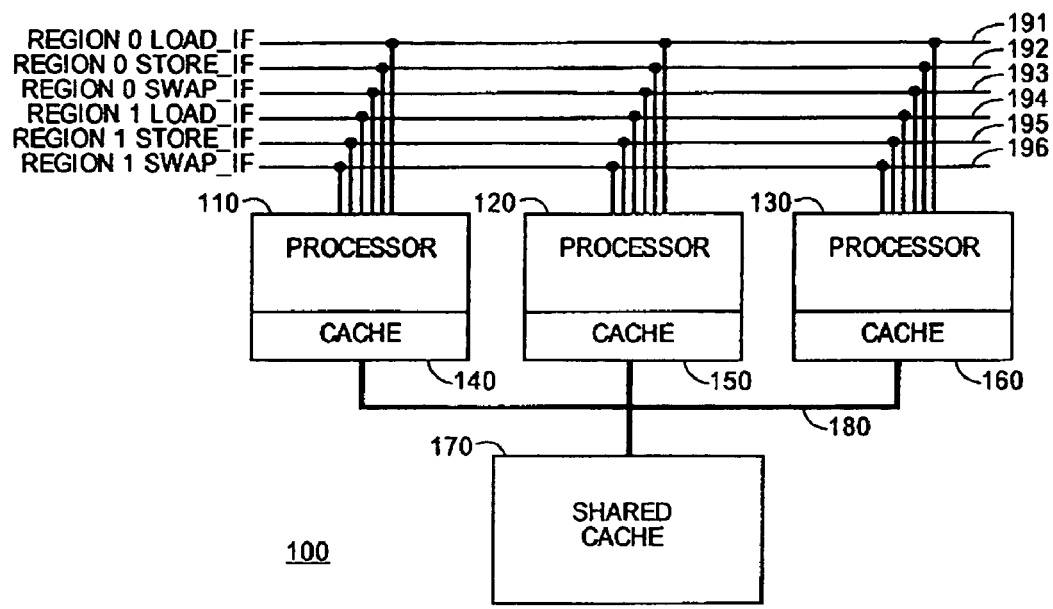
FIG. 1 is a block diagram illustrating a computing system in accordance with an embodiment of the present invention.

It will be appreciated that for simplicity and clarity of illustration, elements illustrated in the figures have not necessarily been drawn to scale. For example, the dimensions of some of the elements are exaggerated relative to other elements for clarity. Further, where considered appropriate, reference numerals have been repeated among the figures to indicate corresponding or analogous elements.

DETAILED DESCRIPTION

In the following detailed description, numerous specific details are set forth in order to provide a thorough understanding of the present invention. However, it will be understood by those skilled in the art that the present invention may be practiced without these specific details. In other instances, well-known methods, procedures, components and circuits have not been described in detail so as not to obscure the present invention.

In the following description and claims, the terms "include" and "comprise," along with their derivatives, may be used, and are intended to be treated as synonyms for each other. In addition, in the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

FIG. 1 is a block diagram illustrating a computing system 100 in accordance with an embodiment of the present invention. System 100 may include processors 110, 120, and 130. System 100 may further include a local cache memory 140 coupled to processor 110, a local cache memory 150 coupled to processor 120, and a local cache memory 160 coupled to processor 130. In addition, computing system 100 may further include a shared cache memory 170, wherein shared cache memory 170 is coupled to processor 110 via local cache 140, coupled to processor 120 via local cache 150, and coupled to processor 130 via local cache 160. Shared cache memory 170 may be coupled to local cache memories 140, 150, and 160 via a bus 180.

Processors 110, 120, and 130 may include logic to execute software instructions and may also be referred to as cores, controllers or processing units. Although system 100 is shown as having three processors, this is not a limitation of the present invention. In other embodiments, system 100 may include more or fewer processors.

Cache memories 140, 150, and 160 may be level 1 (L1) cache memories and cache memory 170 may be a level 2 (L2) cache memory. Cache memories 140, 150, 160, and 170 may be volatile or nonvolatile memories capable of storing software instructions and/or data. Although the scope of the present invention is not limited in this respect, in one embodiment, cache memories 140, 150, 160, and 170 may be volatile memories such as, for example, a static random access memory (SRAM) or a dynamic random access memory (DRAM).

In one embodiment, processors 110, 120, 130 may be integrated together as part of a chip-level multiprocessor (CMP) system that has multiple processors or cores on a single silicon die. In an alternate embodiment, processors 110, 120, and 130 may be discrete components located on a motherboard. Cache memories 140, 150, 160, and 170 may be integrated with processors 110, 120, and 130 or may be external ("off-chip") components.

Cache memories 140, 150, 160, and 170 may collectively serve as the memory space or address space of system 100. Processors 110, 120, and 130 may use an address to access information from the memory space. In one embodiment, a 32-bit address may be used to access, e.g., read or write, information from a particular location in the memory space.

In one embodiment, system 100 may include six signal lines, 191, 192, 193, 194, 195, and 196. These signal lines may be communication paths to communicate information between the components of system 100. The signal lines may also be referred to as data lines or data paths, and may be coupled together in a wired-OR configuration.

As is shown in FIG. 1, signal line 191 may be labeled as REGION 0 LOAD_IF, signal line 192 may be labeled as REGION 0 STORE_IF, signal line 193 may be labeled as REGION 0 SWAP_IF, signal line 194 may be labeled as REGION 1 LOAD_IF, signal line 195 may be labeled as REGION 1 STORE_IF, and signal line 196 may be labeled as REGION 1 SWAP_IF. As is discussed below, signal lines 191-196 may be used to communicate the status of a memory operation to a particular region of memory. For example, signal line 191 may be asserted to indicate that a particular kind of memory operation, e.g., a load issued by processor 110 to region 0 of memory, is not globally observable by all processors of system 100 but is observable by processor 110.

In one embodiment, signal lines 191-196 may be used for memory ordering in system 100. Memory ordering may refer to the order which memory operations are "seen" to happen, e.g., when a processor in a multiprocessor system such as system 100 "sees" memory operations by other processors of system 100. For example, a store operation may be "seen" when a load operation to the same location returns the value stored by that store, or some later store. A load operation may be "seen" when no subsequent store can effect the value returned by that load. Memory operations may be observed by components other than processors of system 100, e.g., a peripheral such as a graphics controller (not shown) may also see a memory operation.

In multiprocessor systems, load and store operations might be each "seen" at different times by different processors. This can lead to software not executing the same way, or operating erratically, on a multiprocessor system compared to a uniprocessor system, depending on what guarantees about when operations are seen by other processors are made by the hardware. The more guarantees the hardware makes, the easier it may be for programmers to create software that works as intended. Memory ordering models that offer more guarantees may be referred to as "strong" models and models that provide few or no guarantees may be referred to as "weak" models.

In an embodiment, a signaling mechanism may be used in system 100 to provide the guarantees and to provide a relatively strong memory ordering model. The signaling mechanism may be referred to as a sideband signaling mechanism and the signals may be referred to as sideband signals.

To implement the signaling mechanism, system 100 may include signal lines 191-196 to communicate the status of a memory operation to a particular region of memory. In addition, processors 110, 120, and 130 may include logic circuitry to generate, receive, and process the memory operation status signals. These signals may be transferred between the components of system 100 using signal lines 191-196. Processors 110, 120, and 130 may assert signal lines 191-196 to communicate the status of a memory operation. In other words, processors 110, 120, and 130 may generate or assert signals to communicate the status of a memory operation.

In an embodiment, the memory or memory space of system 100 may be divided into one or more regions and the ordering guarantees may then be enforced on a region-by-region basis. The memory may be divided into regions by using one or more bits from the memory address of the memory operation to determine the region of memory and these bits may be from anywhere in the address. In various embodiments, the memory of system 100 may be divided into 4, 8, 16, or 32 regions, although the scope of the present invention is not limited in this respect.

In an embodiment, there may be three global signals for each region of memory, although the scope of the present invention is not limited in this respect. These three global signals may be referred to as a load-in-flight signal, a store-in-flight signal, and a swap-in-flight signal. These signals may indicate that a memory operation of the specified type (e.g., load, store, or swap) has been "seen" by one processor but not seen by all processors, a condition that may be referred to as "in-flight" or "in progress." The term "globally observable" may be used to refer to when a memory operation is seen or may be seen by all processors of system 100. Accordingly, a memory operation may be in-flight after it is issued by a processor and up until the point when it is seen or may be seen by all processors of system 100, i.e., up until the point when it is globally observable.

A swap operation may refer to a memory operation that includes both a store and a load and may also be referred to as an atomic swap. In a chip-level multiprocessor (CMP) system, the processors may be able to communicate "in-flight" status changes relatively quickly, e.g., within one processor clock cycle.

In one embodiment, if a load operation is in-flight to a particular region of memory, no component of system 100 will be allowed to issue any other memory operation other than a load operation into that region. For example, if a load operation is in-flight to a particular region of memory, all processors of system 100 will be prevented from issuing a store or swap into that region. This may guarantee that no other memory operation such as, for example, a store or swap, will alter the result of the load operation in the time between when it is "seen" by the first processor to handle it and the time when it is handled by the last processor to handle it, which results in all processors effectively "seeing" the load at the same time. In this embodiment, while a load is in-flight in a particular region, other loads to that region may be allowed to issue since the contents of particular region of the memory of system 100 may not be altered by, e.g., any other store or swap operation, which will be prevented from issuing while a load operation is in-flight.

Similarly, if a store operation is in-flight to a particular region memory, no component of system 100 will be allowed to issue any other memory operation other than a store operation into that region. For example, if a store operation is in-flight to a particular region of memory, all processors of system 100 will be prevented from issuing a load or swap into that region. This may guarantee that all processors will "see" the store effectively at the same time. In this embodiment, while a store is in-flight to a particular region, other stores to that region may be allowed to issue to that region. Since no other component in system 100 is allowed to read, e.g., issue a store or swap, a region a memory while a store is in-flight to that region, other stores to that region may be allowed while the store is in-flight.

In addition, if a swap operation is in-flight to a particular region of memory, no component of system 100 will be allowed to issue any memory operation to that region. For example, if a swap operation is in-flight to a particular region of memory, all processors of system 100 will be prevented from issuing a load, store, or swap to that region. This may guarantee that all processors will "see" the swap effectively at the same time.

Memory operations in one region may have no effect on memory operations in other regions. By operating in this manner, system 100 may provide a relatively strong memory ordering model.

No arbitration or handshaking between the processors may be necessary if the processors of system 100 communicate memory in-flight status to other processors in less than one instruction issue period, i.e., the amount of time it takes between one instruction issuing and the next possible instruction issuing (e.g., one clock cycle). For example, in a chip-level multiprocessor system where multiple processors are integrated together on a single silicon die, a processor of the system may be able to assert a memory in-flight signal and have this signal recognized by other processors in time to prevent the other processors from issuing a memory command. Since the in-flight signals may be logically OR signals or arranged in a wired-OR configuration, multiple processors may all assert an in-flight line simultaneously. So, even if one processor issues a store and another processor issues a load, this may be allowed since while those load and store operations are in-flight, the processors will prevent any other subsequent stores or loads to issue since the in-flight signal lines are asserted.

In one embodiment, processors 110, 120, and 130 may include logic to generate or assert in-flight status signals and communicate this information to other components of system 100 using signal lines 191-196. In other words, processors 110, 120, and 130 may include logic to assert a particular in-flight status signal line depending on the memory operation issued by the processor and the region to which the memory operation is directed. In addition, processors 110, 120, and 130 may include logic to determine whether or not a particular signal line is asserted or deasserted, and logic to prevent itself from issuing a memory operation if the signal line is asserted.

Although the scope of the present invention is not limited in this respect, in an embodiment, the portion of system 100 in which an in-flight operation is currently being processed may be required to maintain the proper memory operation in-flight status for a particular region of memory. In an alternate embodiment, the device that issued the memory operation may have responsibility for asserting or deasserting the appropriate signal line. And after the memory operation is satisfied, the portion of system 100 that satisfied the request may notify the device that the memory operation is satisfied and at this point the device that issued the operation can deassert the line.

In an embodiment, one processor of system 100 may completely handle a memory operation, e.g., a load or a store, from the point when it is issued to the point when it is globally observable. In this embodiment, after the processor issues the memory operation, the processor may assert the appropriate signal line to indicate that the memory operation is in-flight, and then may deassert the signal line after the memory operation is globally obersevable.

In an embodiment, the memory operation may be processed by more than one part of system 100. In this embodiment, responsibility for asserting the signal lines may be transferred to the part of system 100 processing the memory operation. For example, after a processor issues a memory operation, the next level of the cache hierarchy may receive the memory operation and then responsibility for asserting the appropriate signal to indicate that the memory operation is in-flight may be transferred to this level of cache hierarchy.

In system 100 illustrated in FIG. 1, the processors may be responsible for maintaining the memory in-flight signaling for two regions of memory. After the memory hierarchy has taken a memory operation to a point where the memory operation is completed, i.e., no longer in-flight, it has to signal the processors, which may then deassert the signal line or the processors will not hold the signal line asserted for that operation but may continue to assert the signal line for other memory operations.

Although system 100 is illustrated as including six status signals lines, this is not a limitation of the present invention. More or fewer signals lines may be used. For example, in one embodiment, only one signal line may be used to indicate that a particular kind of memory operation, e.g., a load, store, or swap operation, is not globally observable in system 100 but is observable by at least one processor of system 100. This signal line may be asserted by the processor after the processor issues the memory operation.

In an alternate embodiment, the in-flight status may be tracked for each address of the memory space. For example, if a load is in-flight to a particular address, system 100 may prevent other types of memory operations other than load operations from issuing to this address.

In another embodiment, the memory space of system 100 may be divided into four regions. In this embodiment, 12 wires may be used to communicate whether a load, store, or swap is in-flight in each of the four regions of memory. Prior to issuing a memory operation, a processor may look at the address bits to decide what region the memory operation is targeted for and then may check the three in-flight lines for that region to see if any memory operation is in-flight to that region that would prohibit the processor from issuing a memory operation to that region. For example, bits 5 and 6 of a 32-bit memory address may be checked by the processor prior to issuing a memory operation.

As discussed above, the number of regions of memory is not a limitation of the present invention. In-flight status may be communicated for a single region of memory, or the memory may be divided into more than one region. For example, the memory space may be divided into two regions, wherein the odd addresses may form one region of memory and the even addresses may form another region of memory and three in-flight signal lines may be implemented for each region of memory. In another embodiment, the memory may be divided by odd sets and even sets in a set associative cache.

Accordingly, as is discussed above, an embodiment may include a method and apparatus to notify components of system 100 when and where memory operations are in-flight. This may speed up how quickly memory operations are seen or observed in system 100.

As is discussed, in one embodiment, a system to order memory operations is provided, wherein the system includes a processor to use at least one signal for memory consistency, wherein the at least one signal indicates that a particular kind of memory operation is not globally observable in the system but is observable by at least one processor of the system.

Figure 2:
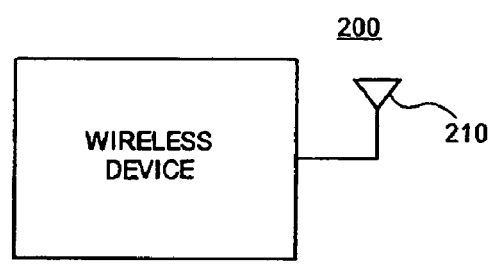
FIG. 2 is a block diagram illustrating a wireless device in accordance with an embodiment of the present invention.

Turning to FIG. 2, shown is a block diagram of a wireless device 200 with which embodiments of the invention may be used. In one embodiment, wireless device 200 may include computing system 100 that is discussed above with reference to FIG. 1.

As is shown in FIG. 2, wireless device 200 may include an antenna 210. In various embodiments, antenna 210 may be a dipole antenna, helical antenna or another antenna adapted to wirelessly communicate information.

Wireless device 200 may be a personal digital assistant (PDA), a laptop or portable computer with wireless capability, a web tablet, a wireless telephone (e.g., cordless or cellular phone), a pager, an instant messaging device, a digital music player, a digital camera, or other devices that may be adapted to transmit and/or receive information wirelessly. Wireless device 200 may be used in any of the following systems: a wireless personal area network (WPAN) system, a wireless local area network (WLAN) system, a wireless metropolitan area network (WMAN) system, or a wireless wide area network (WWAN) system such as, for example, a cellular system.

An example of a WLAN system includes a system substantially based on an Industrial Electrical and Electronics Engineers (IEEE) 802.11 standard. An example of a WMAN system includes a system substantially based on an Industrial Electrical and Electronics Engineers (IEEE) 802.16 standard. An example of a WPAN system includes a system substantially based on the Bluetooth™ standard (Bluetooth is a registered trademark of the Bluetooth Special Interest Group). Another example of a WPAN system includes a system substantially based on an Industrial Electrical and Electronics Engineers (IEEE) 802.15 standard such as, for example, the IEEE 802.15.3a specification using ultrawide-band (UWB) technology.

Examples of cellular systems include: Code Division Multiple Access (CDMA) cellular radiotelephone communication systems, Global System for Mobile Communications (GSM) cellular radiotelephone systems, Enhanced data for GSM Evolution (EDGE) systems, North American Digital Cellular (NADC) cellular radiotelephone systems, Time Division Multiple Access (TDMA) systems, Extended-TDMA (E-TDMA) cellular radiotelephone systems, GPRS, third generation (3G) systems like Wide-band CDMA (WCDMA), CDMA-2000, Universal Mobile Telecommunications System (UMTS), or the like.

Although computing system 100 is illustrated as being used in a wireless device in one embodiment, this is not a limitation of the present invention. In alternate embodiments system 100 may be used in non-wireless devices such as, for example, a server, a desktop, or an embedded device not adapted to wirelessly communicate information.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

The invention claimed is:

1. A method to order memory operations in a multi-processor system, the method comprising:
dividing a memory space of the system into at least two regions;
using at least two signals for each region of the at least two regions, wherein each signal of the at least two signals is associated with a particular kind of memory operation to one region of the at least two regions and indicates that the particular kind of memory operation is not globally observable in the one region but is observable in the one region by at least one processor of the multi-processor system.

2. The method of claim 1, wherein a first signal of the at least two signals for a particular region indicates that a load operation issued by the at least one processor is not globally observable for the particular region by all processors of the system but is observable by the at least one processor for the particular region and wherein a second signal of the at least two signals for the particular region indicates that a store operation issued by the at least one processor is not globally observable for the particular region by all processors of the system but is observable for the particular region by the at least one processor.

3. The method of claim 1, further including using at least three signals for each region of the at least two regions, wherein a first signal of the at least three signals for a particular region indicates that a load operation issued by the at least one processor is not globally observable for the particular region by all processors of the system but is observable for the particular region by the at least one processor, wherein a second signal of the at least three signals for the particular region indicates that a store operation issued by the at least one processor is not globally observable for the particular region by all processors of the system but is observable for the particular region by the at least one processor, wherein a third signal of the at least three signals for the particular region indicates that a swap operation issued by the at least one processor is not globally observable for the particular region by all processors of the system but is observable by the at least one processor for the particular region.

4. The method of claim 1, wherein said using includes using a first signal of the at least two signals to indicate that a store operation issued by the at least one processor is not globally observable for the particular region by all processors of the system.

5. The method of claim 4, further comprising asserting the first signal to indicate that the store operation is not globally observable for the particular region by all processors of the system but is observable for the particular region by the at least one processor.

6. The method of claim 5, further comprising allowing other store operations to be issued for the particular region by any of the processors of the system if the first signal is asserted.

7. The method of claim 5, further comprising preventing any processor of the system to issue a memory operation other than a store operation for the particular region if the first signal is asserted.

8. The method of claim 5, further comprising preventing any processor of the system to issue a load operation or swap operation for the particular region if the first signal is asserted.

9. The method of claim 5, further comprising deasserting the first signal after the store operation is globally observable for the particular region by all processors of the system.

10. The method of claim 1, wherein a first signal of the at least two signals for a particular region indicates that a load operation issued by the at least one processor is not globally observable for the particular region by all processors of the system.

11. The method of claim 10, further comprising asserting the first signal to indicate that the load operation is not globally observable for the particular region by all processors of the system but is observable for the particular region by the at least one processor.

12. The method of claim 10, further comprising allowing other load operations to be issued for the particular region by any of the processors of the system if the first signal is asserted.

13. The method of claim 10, further comprising preventing any processor of the system to issue a memory operation for the particular region other than a load operation if the first signal is asserted.

14. The method of claim 10, further comprising preventing any processor of the system to issue a store operation or swap operation for the particular region if the first signal is asserted.

15. The method of claim 10, further comprising deasserting the first signal after the load operation is globally observable for the particular region by all processors of the system.

16. The method of claim 1, wherein a first signal of the at least two signals for a particular region indicates that a swap operation issued by the at least one processor is not globally observable for the particular region by all processors of the system.

17. The method of claim 16, further comprising asserting the first signal to indicate that the swap operation is not globally observable for the particular region by all processors of the system but is observable for the particular region by the at least one processor.

18. The method of claim 16, further comprising preventing any processor of the system to issue any memory operation for the particular region if the first signal is asserted.

19. The method of claim 16, further comprising preventing any processor of the system to issue a load operation, a store operation, or a swap operation for the particular region if the first signal is asserted.

20. The method of claim 16, further comprising deasserting the first signal after the swap operation is globally observable for the particular region by all processors of the system.

21. A system, comprising:
a first processor;
a second processor coupled to the first processor,
a first signal line coupled to the first processor and the second processor to indicate whether a load operation is globally observable in a first region of a memory shared by the first and second processors; and
a second signal line coupled to the first processor and the second processor to indicate whether a store operation is globally observable in the first region.

22. The system of claim 21, wherein the first processor has logic to assert the first signal line after the first processor issues the load operation to indicate that the load operation is not globally observable for the first region but is observable by at least one processor of the system.

23. The system of claim 22, wherein the second processor has logic to prevent the second processor from issuing a memory operation other than a load operation to the first region while the first signal line is asserted.

24. The system of claim 22, wherein the second processor has logic to prevent the second processor from issuing a store operation to the first region while the first signal line is asserted.

25. The system of claim 21, wherein the first processor has logic to assert the second signal line after the first processor issues the store operation to indicate that the store operation is not globally observable for the first region but is observable by at least one processor of the system.

26. The system of claim 25, wherein the second processor has logic to prevent the second processor from issuing a memory operation other than a store operation to the first region while the second signal line is asserted.

27. The system of claim 21, further comprising:
a third signal line coupled to the first processor and the second processor; and
a fourth signal line coupled to the first processor and the second processor.

28. The system of claim 27, wherein the first processor has logic to assert the third signal line after the first processor issues a load operation to a second region of the memory of the system, wherein asserting the third signal line indicates that the load operation is not globally observable for the second region but is observable for the second region by the at least one processor.

29. The system of claim 28, wherein the first processor has logic to assert the fourth signal line after the first processor issues a store operation to a second region of the memory of the system, wherein asserting the fourth signal line indicates that the store operation is not globally observable for the second region but is observable for the second region by the at least one processor.

30. The system of claim 21, wherein the first processor and second processor are integrated together on a single silicon die.

31. The system of claim 21, further comprising:
a first local cache memory coupled to the first processor;
a second local cache memory coupled to the second processor; and
a shared cache memory, wherein the shared cache memory is coupled to the first processor via the first local cache and the shared cache is coupled to the second processor via the second local cache.

32. A system, comprising:
first and second processors;
a memory divided into multiple regions;
at least two signal lines for each region of the multiple regions, each of the at least two signal lines coupled to first and second processors; and
an antenna coupled to the first and second processors;
wherein each signal line of the at least two signal lines is associated with a particular kind of memory operation to a particular one of the multiple regions and is to indicate that the particular kind of memory operation is not globally observable for the particular one of the multiple regions but is observable for the particular one of the multiple regions by at least one processor of the system.

33. The system of claim 32, wherein the system comprises a wireless phone.

* * * * *